United States Patent
Ruck et al.

(10) Patent No.: US 8,745,886 B2
(45) Date of Patent: Jun. 10, 2014

(54) METHOD FOR CONTROLLING A MEASUREMENT PROCESS BY MEANS OF VIRTUAL SURFACES

(75) Inventors: Otto Ruck, Ellwangen-Pfahlheim (DE); Ralf Bernhardt, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 13/572,967

(22) Filed: Aug. 13, 2012

(65) Prior Publication Data
US 2013/0036619 A1    Feb. 14, 2013

Related U.S. Application Data

(63) Continuation of application No. PCT/EP2011/051895, filed on Feb. 9, 2011.

(30) Foreign Application Priority Data

Feb. 15, 2010  (DE) .......................... 10 2010 008 751
Mar. 23, 2010  (DE) .......................... 10 2010 012 974

(51) Int. Cl.
*G01B 5/008*    (2006.01)

(52) U.S. Cl.
USPC .......................................................... 33/503

(58) Field of Classification Search
USPC .......................................................... 33/503
See application file for complete search history.

(56) References Cited

U.S. PATENT DOCUMENTS

| | | | |
|---|---|---|---|
| 5,491,638 A * | 2/1996 | Georgi et al. ................. 700/195 |
| 5,501,096 A * | 3/1996 | Stettner et al. ................. 73/1.79 |
| 5,737,244 A | 4/1998 | Ruck |
| 5,895,444 A * | 4/1999 | Ruck et al. ................... 702/168 |
| 7,693,325 B2 * | 4/2010 | Pulla et al. .................... 382/154 |
| 7,783,445 B2 * | 8/2010 | McLean et al. ................ 702/95 |
| 7,805,854 B2 * | 10/2010 | Eaton .............................. 33/551 |
| 8,255,184 B2 * | 8/2012 | Chang et al. .................. 702/150 |
| 8,336,219 B2 * | 12/2012 | Grzesiak et al. ............... 33/502 |
| 2001/0045021 A1 * | 11/2001 | Matsuda et al. ............... 33/502 |
| 2006/0273268 A1 * | 12/2006 | Bae et al. .................. 250/559.19 |
| 2010/0269361 A1 * | 10/2010 | Matsumiya et al. ........... 33/503 |
| 2012/0316666 A1 * | 12/2012 | Boyl-Davis et al. ........... 700/98 |
| 2013/0139397 A1 * | 6/2013 | Jordil et al. .................... 33/503 |

FOREIGN PATENT DOCUMENTS

| | | |
|---|---|---|
| DE | 43 36 863 A1 | 5/1995 |
| DE | 198 05 155 A1 | 8/1999 |
| WO | WO 2008/074989 A1 | 6/2008 |
| WO | WO 2009/024783 A1 | 2/2009 |

OTHER PUBLICATIONS

English language translation of Examination Report received from German Patent and Trademark Office; Sep. 27, 2010; 4 pp.
ISA/EP; English language translation of International Preliminary Report on Patentability (Chapter 1); issued by WIPO Aug. 21, 2012; 7 pp.

* cited by examiner

*Primary Examiner* — Christopher Fulton
(74) *Attorney, Agent, or Firm* — Harness, Dickey & Pierce, P.L.C.

(57) ABSTRACT

The present invention relates to a method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device. Furthermore, the surface comprises at least one actual section, which corresponds to a measurement object surface, and at least one virtual section. The present invention also relates to a corresponding coordinate measuring machine and computer program.

6 Claims, 6 Drawing Sheets

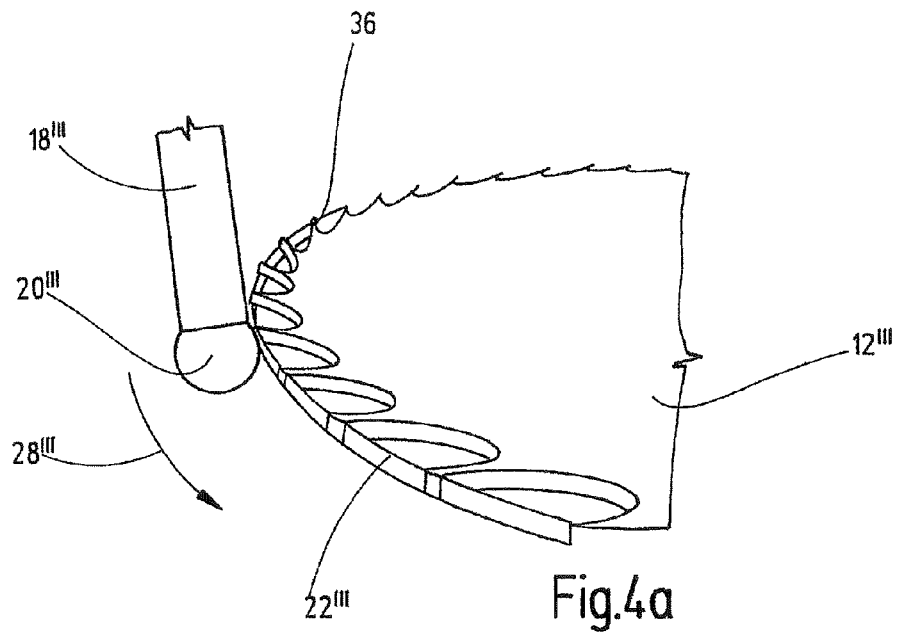
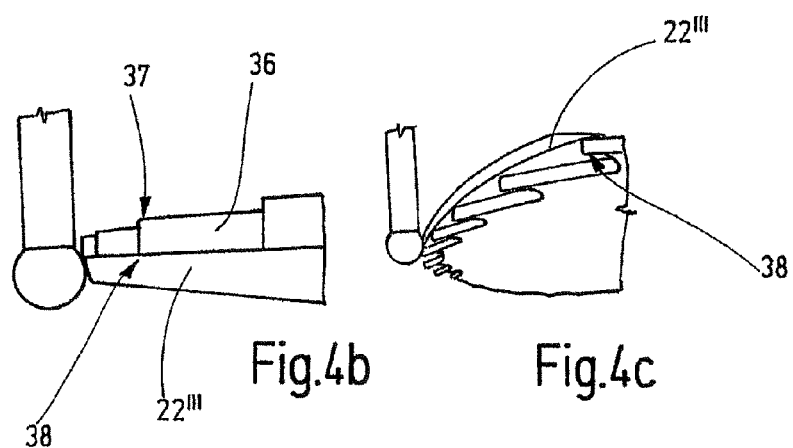

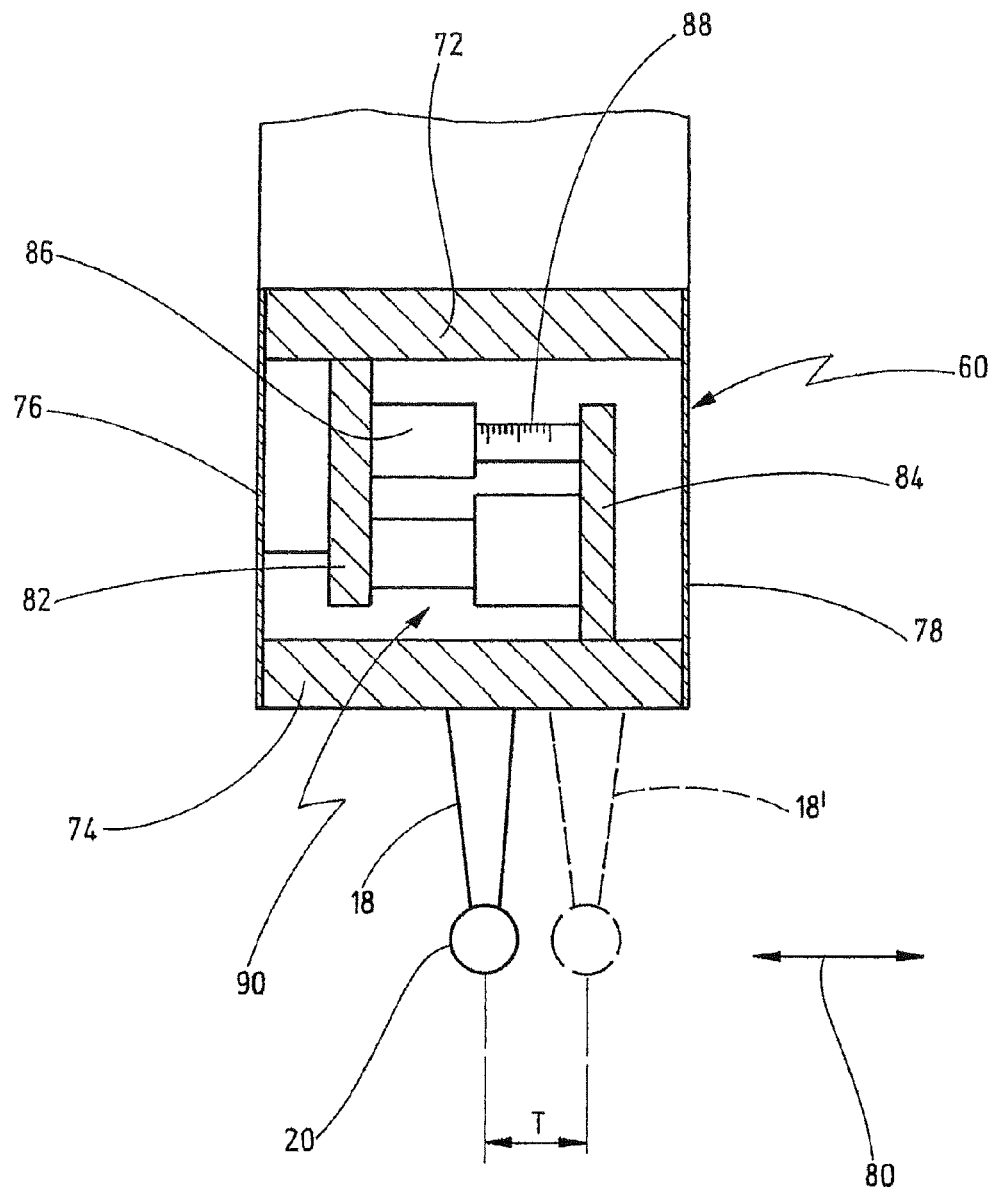

METHOD FOR CONTROLLING A MEASUREMENT PROCESS BY MEANS OF VIRTUAL SURFACES

CROSS REFERENCE TO RELATED APPLICATIONS

This is a Continuation application of International patent application PCT/EP2011/051895, filed Feb. 9, 2011, which was published in German and claims the priority of German patent application DE 10 2010 008 751.3, filed Feb. 15, 2010, and of German patent application DE 10 2010 012 974.7, filed Mar. 23, 2010. The entire contents of these priority applications are incorporated herein by reference.

BACKGROUND OF THE INVENTION

The present invention relates to a method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device.

The present invention furthermore relates to a coordinate measuring machine for measuring a measurement object, having a controlling device and a feeler head, which comprises a feeler pin, wherein a relative movement between the feeler pin and a surface of the measurement object is controlled by the controlling device.

Three-dimensional coordinate measuring machines are widely known in the prior art. In industrial applications, they are used to measure workpieces and, for example, thereby subject them to quality control. Such coordinate measuring machines are, however, also used in other fields of application, for example in the field of "reverse engineering".

In order to measure the workpieces, various measuring systems are used. Conventionally, these are either optical measuring systems which allow contactless measuring of the workpieces, or tactile measuring systems in which the workpiece is sampled at particular points in order to detect the coordinates of the sampled points of the workpiece.

The present invention relates to coordinate measuring machines which comprise tactile measuring systems. Such a coordinate measuring machine has a feeler head, which is arranged movably in three dimensions relative to a workpiece in a measurement space. The feeler head comprises a sensor unit which supports a feeler pin in a mobile fashion and is capable of detecting a deflection of the feeler pin relative to the feeler head base. The feeler pin comprises a feeler tip on which a feeler object, generally a feeler ball, is provided. Owing to the known geometry of the feeler pin and the known position of the feeler head in the measurement space, spatial coordinates of the sampled measurement point on the workpiece can be determined with the aid of the deflection detected by the sensor unit.

In order to measure a workpiece, various types of measurement are known. The measuring may be carried out by sampling a multitude of points individually. Such a measurement method makes it possible, for example, to detect entirely unknown geometries, but requires increased time expenditure owing to the individual sampling of each measurement point.

Besides this, so-called scanning methods are also known, in which the feeler pin is displaced along the workpiece to be measured, in contact with the workpiece to be measured, and a multitude of measurement points along a path on the workpiece surface are thus detected. In this way, it is possible to detect a large number of measurement points very rapidly. For this, however, it is necessary to control the movement path of the feeler head so that the feeler pin, or the feeler ball, is constantly in contact with the surface of the workpiece. To this end, a setpoint geometry of the path is in general previously known. It may for example be known that the internal diameter of a circular bore is meant to be measured, so that the setpoint geometry is a circular path. Knowledge of this setpoint geometry facilitates the regulation of the path of the feeler head during the scanning process, so that adjustment of the path of the feeler head only has to be carried out with the aid of the actual deviation of the measurement points from the setpoint geometry.

Furthermore, so-called actively measuring and so-called passively measuring feeler heads are known in the prior art. In the case of passively measuring feeler heads, the feeler pin is essentially supported by means of mechanical spring elements. An deflection of the feeler pin is therefore always proportional to a spring force of the bearing and therefore to a feeler force, with which the feeler pin presses against the workpiece surface. During a scanning process along a workpiece surface, it is advantageous for the feeler force only to lie in a particular range, in order to avoid excessive bending of the feeler pin or damage to the workpiece. Since with passively measuring feeler heads the feeler force is proportional to the deflection of the feeler pin, in this case the feeler head needs to be moved in order to change the deflection of the feeler pin and therefore the feeler force. Movement of the feeler head entails accelerations and therefore inertial forces, which can make it more difficult to control such a passively measuring feeler head.

In the case of actively measuring feeler heads, the feeler force can be set independently of the deflection of the feeler pin, with the aid of measuring force transducers (for example electric motor-driven plunger coils or piezo elements). Even in the event of large deflections of the feeler pin, this makes it possible to sample the workpiece with a small feeler force and/or a feeler force which is constant over the course of a scanning process, without this entailing excessive movement of the feeler head, and sometimes even with no movement of the feeler head.

The present invention is primarily intended to be used with actively measuring feeler heads. In principle, however, it may also be employed for passively measuring feeler heads.

Scanning methods can quite readily be used when smooth surfaces are to be sampled. If the surfaces to be sampled comprise elevations or depressions, however, for instance milled grooves, problems may arise when the feeler pin with its feeler ball catches on an elevation or in a depression. Depressions in workpiece surfaces may in particular constitute a problem here. Under certain circumstances, however, it is not actually necessary to measure the depression in the workpiece surface accurately, since what is important is only the profile of the surface in which this depression is formed, and for example whether the surface is actually circular, or flat.

The basic terms of coordinate measuring technology, and in particular methods for evaluating the measurement results, are known to the person skilled in the art. Information about known methods of coordinate measuring technology, and in particular about interpolation methods, may be found in the textbook Weckenmann, Gawande, "Koordinatenmeßtechnik", Carl Hanser Verlag, Munich, 1999, ISBN 3-446-17991-7, to which reference is explicitly made here in this regard.

One problem which often arises is that as soon as the feeler pin moves over a depression in a surface, a feeler ball of the feeler pin is adjusted by a controlling device so that the feeler pin enters the depression. The feeler ball so to speak "falls" into the depression. Subsequently, when the groove ends, the feeler pin then comes in contact with the opposite edge of the groove. Since the scanning process is carried out with a particular rate of advance, for example five millimeters per second, it is possible that the feeler pin can no longer be "retracted" from the groove rapidly enough. As a result, either the feeler pin may be damaged or the scanning process will need to be interrupted so that the controlling device of the coordinate measuring machine can first release the feeler pin from the depression or groove.

Possible solutions for avoiding such "entry" of the feeler pin into depressions of a surface to be measured have therefore been sought.

For instance, U.S. Pat. No. 5,895,444 (A), which constitutes a development of U.S. Pat. No. 5,737,244 (A), proposes that, with approximate knowledge of the position of a workpiece depression, a negative virtual measuring force be set. "Negative" in this case means that the measuring force points in the normal direction away from the workpiece surface to be measured. The controlling device will then assume that the feeler force is too great and will lift the feeler ball from the workpiece surface. In this way, it is possible to "jump" over the depression. After the depression has been crossed over, the virtually provided force is cancelled and the controlling device continues to sample the workpiece surface. This, however, requires that the approximate position of the depressions be known.

It is also proposed in WO 2008/074989 A1 to lift the feeler ball from the workpiece surface when approaching a depression, in order to avoid entry and catching of the feeler ball, or the feeler pin, in a depression. Here again, the approximate position of a groove or depression must be known.

It is an object of the present invention to provide a way of scanning a workpiece surface comprising depressions, which makes scanning possible even if there is in fact no workpiece at a measurement position, for example because of a depression. In this context, the intention is for all known measurement, scanning and interpolation methods to remain usable without modifications, and to prevent a feeler pin from catching in the depression even if there is no knowledge about depressions which are present. Furthermore, it must still be possible to identify whether a detected measurement value derives from the workpiece surface actually being scanned.

SUMMARY OF THE INVENTION

According to a first aspect of the invention there is provided a method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device, wherein the surface comprises at least one actual section, which corresponds to a measurement object surface, and at least one virtual section.

According to a second aspect of the invention there is provided a coordinate measuring machine for measuring a measurement object, having a controlling device and a feeler head, which comprises a feeler pin, wherein a relative movement between the feeler pin and a surface of the measurement object is controlled by the controlling device, wherein the surface comprises at least one actual section, which corresponds to a measurement object surface, and at least one virtual section.

According to a third aspect of the invention there is provided a, in particular non-transitory, computer program comprising program code means to carry out all the steps of a method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device, wherein the surface comprises at least one actual section, which corresponds to a measurement object surface, and at least one virtual section, in particular when the computer program is run on a coordinate measuring machine, in particular in the controller of a coordinate measuring machine.

Virtual surfaces not actually present on the workpiece are thus taken into account in the controlling process; they are defined beforehand by a user of the coordinate measuring machine and they may, for example, be specified with the aid of suitable user software. These virtual surfaces may be arranged substantially arbitrarily in the measurement space with respect to their shape and position, and may for example consist of plane faces, cylinders or spheres. The virtual surface supplements and/or modifies the workpiece surface actually present, and it therefore determines the movement path of the feeler pin relative to the workpiece and the actual workpiece surface. Since the setpoint geometry of the workpiece to be measured is essentially known, it is advantageously possible to define the virtual surface, and place it in the measurement space, in such a way that depressions in the real workpiece surface are "filled in". The feeler pin then "jumps" over the depression by being guided along the virtual surface owing to the controlling. In some cases, it is advantageous for the virtual surface to lie in the workpiece and therefore below the actual workpiece surface. If a sphere is intended to be scanned, for example, the virtual surface could be a sphere having a somewhat smaller radius. If there are then depressions, for example grooves, in the actual workpiece surface, these depressions or grooves will be "covered" by the virtual surface. When a feeler ball of the feeler pin then meets this virtual surface, controlling and measurement variables are generated which correspond to an actual surface. Accordingly, the controlling device controls the position of the feeler ball, or feeler head, as if the virtual surface were an actual surface. A feeler ball would therefore not enter as far as the bottom of the depression, but instead travel along the virtual surface. The height differences to be overcome are therefore smaller so that, at the end of an actual depression, the feeler ball or feeler pin can readily return onto the actual workpiece surface. When scanning a toothed wheel geometry, an advantageous virtual surface may form an envelope body which extends over the tips of the individual teeth like an imaginary sheet. When the controlling device moves the feeler pin along such a virtual surface, the feeler object at the free end of the feeler pin does not enter between the teeth actually present.

The surface which is measured by the coordinate measuring machine, and along which the feeler ball or the feeler pin has been moved in a controlled fashion, is therefore composed of real sections actually present on the workpiece, which correspond to the workpiece surface to be measured, and virtual sections which are specified for the controlling device, for example in the form of geometrical data, but which do not exist as a real surface. Preferably, nothing changes in terms of the controlling device and the controlling algorithm of the feeler head. Since the virtual surfaces can therefore readily be used with the already existing controlling and interpolation software of a coordinate measuring machine, the virtual surfaces can be scanned and combined with real or actual workpiece surfaces.

In principle, it makes no difference whether the feeler pin or feeler head scans a stationary surface or is moved along a stationary measurement object, or whether the surface or measurement object is moved along a stationary feeler pin or feeler head. It is also possible for both the feeler pin, or feeler head, and the surface, or the measurement object, to be moved. What is crucial is merely a relative movement between the measurement object and the feeler head. A suitable arrangement may be provided depending on the measurement object to be measured. If frequently different measurement objects with different shapes are intended to be measured, for instance, it is advantageous to arrange the measurement object stationary and to move the feeler pin. If, however, only rotationally symmetrical measurement objects substantially shaped in the same way, for example toothed wheels, are intended to be measured, it may be more advantageous to keep the feeler pin stationary and to rotate the measurement object. In this way, the mass to be moved can be kept small.

According to a preferred refinement of the invention, measurement values which are detected in the at least one virtual section are marked.

Since the measurement values detected in the virtual sections do not correspond to actual measurement values of the real workpiece surface, it is advantageous to omit these from the evaluation of the detected spatial coordinates. Advantageously, the measurement values which are detected in the at least one virtual section are marked. These marked measurement values may then, for example, be filtered out or masked so that they are not used for subsequent processing or evaluation.

Furthermore, the feeler head may be an actively measuring feeler head and the controlling device may control a measuring force of the feeler pin, a counterforce being applied to a measuring force transducer of the actively measuring feeler head proportionally to a penetration depth of the feeler pin into the at least one virtual section.

In this way, in the case of active feeler heads, it is possible to convert the virtual surface, which has been established by a user or automatically, into actual inputs into the controlling device of the feeler head. The virtual surface is generated as a three-dimensional vector field, the vector field occupying a particular position in the measurement space as a function of the position of the virtual surface. With the aid of the position, the spatial coordinates of the measurement space, at which the virtual surface is located, are then known. For each spatial coordinate, a vector of a virtual force with its magnitude and its direction is then established. The direction points perpendicularly away from the surface of the virtual plane. The magnitude increases with increasing depth in the virtual surface, i.e. it is small at the surface and then increases with increasing depth. The virtual forces used here therefore have different magnitudes depending on the spatial coordinates assigned to them. The virtual surface could therefore be referred to as a "virtual body". If the feeler ball then moves to a point with spatial coordinates which belong to the virtual surface, the virtual force stored for these spatial coordinates is then applied to a setpoint feeler force in the opposite direction to the setpoint feeler force. For the controlling device of the coordinate measuring machine, the effect of this is that it seems as if a force is exerted by the virtual surface on the feeler ball of the feeler pin, as soon as the feeler ball "touches" the virtual surface. A counterforce is then applied to the setpoint values of the measuring force transducer by the controlling device. Since the magnitude of the virtual forces, from which the virtual surface is formed, increases with an increasing penetration depth into the virtual surface, an equilibrium is set up between the setpoint feeler force and the virtual force at a certain penetration depth. If this equilibrium is reached, the feeler ball does not enter further into the virtual plane. The feeler head therefore enters the virtual surface only to a very small extent. The position of the virtual plane is then correspondingly selected so that the penetration depth of the feeler ball makes it possible to "climb over" the groove edge at the end of the groove.

The procedure described above has the advantage over the prior art, in particular, that a position of the grooves or depressions in the actual surface of the measurement object does not need to be known. By means of the virtual surface, a region can be produced which a feeler pin cannot enter and which is defined either absolutely or relatively to the measurement object. Owing to this "forbidden zone" defined in the measurement region by the virtual surfaces, the feeler pin is so to speak subjected to a "safety net" during a scanning process, which prevents the feeler pin from falling into the groove.

As an alternative, both in the method according to the first aspect of the invention and in the coordinate measuring machine according to the second aspect of the invention, the feeler head may be a passively measuring feeler head and the controlling device may regulate an deflection of the feeler pin, a virtual deflection being applied to a setpoint deflection of the feeler pin proportionally to a penetration depth of the feeler pin into the at least one virtual section.

In this case, the virtual deflection may preferably be directed oppositely to the setpoint deflection so that, for a particular penetration depth of the feeler pin into the at least one virtual section, an equilibrium is set up between the setpoint deflection and the virtual deflection, or an equilibrium between the controller specifications.

Although the method according to the first aspect of the invention and the coordinate measuring machine according to the second aspect of the invention are particularly suitable for/with actively measuring feeler heads, they may also be applied to passively measuring feeler heads. In this case, the virtual surfaces are not implemented by virtual forces assigned to particular spatial coordinates, but instead a virtual deflection is applied to the setpoint deflection. The magnitude of the vectors of the virtual deflection likewise increases with an increasing penetration depth. The directions of the vectors of the virtual deflections are directed oppositely to the direction of the setpoint deflection, so that an equilibrium between a corresponding virtual deflection and the setpoint deflection is set up at a particular penetration depth. Here again, control of the feeler head along the virtual surface is thus achieved.

The two refinements described above for active and passive feeler heads therefore have the common feature that the virtual sections are formed by at least one virtual surface, the at least one virtual surface being formed as a multitude of vectors which are respectively assigned with their magnitude and their direction to a particular spatial coordinate.

In another refinement both of the method according to the first aspect of the invention and of the coordinate measuring machine according to the second aspect of the invention, a position displacement of a known setpoint geometry of the measurement object or of the surface to be measured may be identified during the measurement process along the at least one actual section, and an arrangement of the at least one virtual section may be adapted with the aid of the position displacement.

A dynamic displacement of the position of the at least one virtual surface can therefore be provided. This is advantageous in particular when scanning workpieces which have known setpoint geometries, for example a plane or a cylinder. In this case, for example, a recognized position displacement of a bore—i.e. the midpoint of the bore does not lie at the assumed location—is modified not only for adjustment of an interpolation method—i.e. the position of the setpoint geometry is adapted for the interpolation method used—but at the same time also for adjustment of the position or arrangement of the virtual surface. Of course, such adaptation or adjustment of virtual surfaces should only be carried out when the feeler ball lies on an actual or real surface, and measurement values which have been detected on an actual surface are being employed.

In this way, it is possible to adapt the position of the virtual elements or virtual surfaces to an actual workpiece shape during the measurement process.

Lastly, both in the method according to the first aspect of the invention and in the coordinate measuring machine according to the second aspect of the invention, a geometrical shape of the virtual surface may correspond to a plane or a cylinder or a sphere.

In this way, it is possible to adapt the shape of the at least one virtual surface suitably to the actual workpiece.

It is to be understood that the features mentioned above and those yet to be explained below may be used not only in the respectively indicated combination, but also in other combinations or separately, without departing from the scope of the invention.

BRIEF DESCRIPTION OF THE DRAWINGS

Exemplary embodiments of the invention will be explained below with reference to the appended drawings, in which:

FIGS. 4a to 4c show a fourth embodiment of the method, FIG. 8 shows a simplified schematic representation of an active feeler head of the coordinate measuring machine in FIG. 7.

DETAILED DESCRIPTION OF THE PREFERRED EMBODIMENTS

Figure 1:
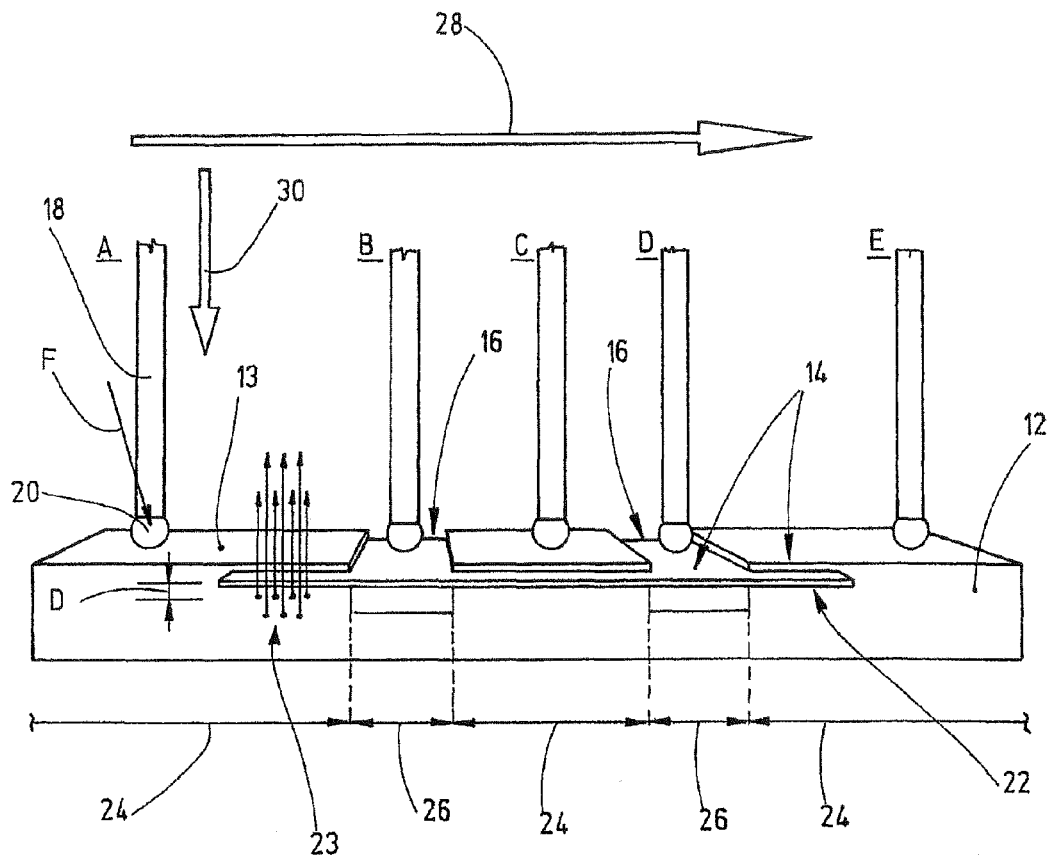
FIG. 1 shows a schematic view of a measurement process according to an embodiment of the method according to the first aspect of the invention.

FIG. 1 shows the conduct of a method 10 in an embodiment such as may be carried out on a measurement object 12 represented by way of example.

In the present example, the measurement object 12 is a plate, which is intended to be checked to see whether it is actually flat.

To this end, a measurement object surface 13 is to be measured. With the aid of the measurement points obtained, a check as to whether the measurement object surface 13 of the measurement object 12 is actually flat can then be carried out in the scope of an evaluation.

In order to achieve this, a surface 14 whose composition will be described in more detail below is measured.

The measurement object surface 13 comprises grooves 16 at a few locations. The grooves 16 are represented merely by way of example of possible irregularities, in particular depressions, in the measurement object surface 13. Any other types of obstacles, which might interfere with the measurement process, may also be envisaged.

A feeler pin 18 is provided which, at one of its ends, comprises a feeler ball 20 with which the surface 14 is intended to be sampled. The feeler pin 18 is represented in different positions A to E in FIG. 1. In the scope of a measurement process, the feeler pin 18 passes through the positions A to E in alphabetical order, i.e. starting with A and ending with E.

When the feeler pin 18 then travels along the measurement object surface 13 in order to scan it, the feeler ball 20 being in contact with the measurement object surface 13, the feeler pin 18 has to cross the grooves 16. In order that controlling when carrying out the method 10 does not allow the feeler pin 18 to enter too deeply into the grooves 16, so that the feeler pin 18 with the feeler ball 20 may possibly catch in the grooves 16, a virtual surface 22 is provided which is arranged in accordance with the measurement object surface 13 actually to be measured. In the present example, the intention is to establish whether the measurement object surface 13 is actually flat, or planar. Accordingly, in this case the virtual surface 22 may extend parallel to the measurement object surface 13 and a few millimeters below it. By means of such constraints, the virtual surface 22 may also be arranged automatically, or with computer assistance.

The virtual surface 22 is formed as a multitude of vectors 23, which are respectively assigned with their magnitude and their direction to a particular spatial coordinate (X, Y, Z). Depending on the type of feeler head, the vectors may be virtual forces or virtual vectors.

When carrying out the method 10, the virtual surface 22 is treated as an actual or real measurement object surface 13 of the measurement object 12. Accordingly, the feeler pin 18 with the feeler ball 20 is controlled as if the virtual surface 22 were an actual measurement object surface 13. In this way, it is possible to prevent the feeler ball 20 from entering too far into the groove 16. The surface 14, which is thus scanned by the feeler ball 20 during the method 10, is therefore composed of the actual measurement object surface 13 and the virtual surface 22. The surface 14 therefore comprises actual sections 24 and virtual sections 26. During an evaluation of the measurement results, it is consequently necessary to take care that only those measurement results which were detected during the feeler of the actual measurement object surface 13 are employed. Measurement values are also obtained during sampling of the virtual surface 22 in the virtual sections 26 of the surface 16; these, however, naturally do not correspond to the real situation and must therefore be filtered out during an evaluation.

The conduct of a measurement process of the method 10 therefore begins at a position A of the feeler pin 18, at which the feeler ball 20 samples the actual measurement object surface 13. The feeler ball 20 lies in an actual section 24 of the surface 14. The feeler ball 20 is then moved along a direction of advance 28, the direction of advance 28 always approximately following a setpoint geometry of the measurement object surface 13 to be measured. The feeler ball 20 presses on the measurement object surface 13 in a normal direction 30, i.e. perpendicularly to the direction of advance 28. A feeler force F therefore acts between the feeler ball 20 and the measurement object surface 13. In the case of a stationary feeler pin 18, the feeler force F may deviate from the normal direction 30, as is represented merely by way of example in FIG. 1. In this case, the feeler force F may lie within a static friction cone of the point of contact between the feeler ball 20 and the measurement object surface 13. However, as soon as the feeler ball 20 is moved along the measurement object surface 13 and the static friction becomes sliding friction, the direction of the feeler force F can be determined by means of a conventional parallelogram of forces from the force in the normal direction 30 and the sliding friction force in the direction of the measurement object surface 13. If it is assumed that, with a small coefficient of friction existing between the feeler ball 20 and the measurement object surface 13, the magnitude of the sliding friction force is very small compared with the magnitude of the force in the normal direction, when there is a small coefficient of friction the direction of the feeler force F corresponds essentially to the normal direction 30.

When the feeler ball 20 now passes from the measurement object surface 13 into the groove 16, the feeler ball 20 moves into the groove to a certain extent until it meets the virtual surface 22. The feeler ball 20 then lies in the virtual section 26 of the surface 14. For the method, it makes essentially no difference whether the feeler ball 20 lies on a real, or actual, measurement object surface 13 or on the virtual surface 22. The inputs into the controlling device, which controls the feeler pin 18, are the same. If the feeler ball 20 then meets the virtual surface 22, then a counterforce directed against the feeler ball 20 in the normal direction 30 is provided as an input into a controlling device. The magnitude of the counterforce may in this case be configured as proportional to a penetration depth D of the feeler ball 20 into the virtual surface 22. The virtual surface 22 is so to speak configured as a spatial region comprising a multitude of virtual force vectors, a magnitude of the force vectors increasing when moving more deeply into the virtual surface. The effect of this is that the feeler ball 20 "enters" the virtual surface to a certain—small—extent, until the virtual counterforce corresponds to the setpoint feeler force. The feeler ball 20 therefore does not enter the groove 16 fully, but merely samples—on a virtual basis—the virtual surface 22. In this way, the feeler ball 20 crosses the virtual section 26 in the position B represented.

Since the virtual surface 22 is arranged only a few millimeters below the measurement object surface 13 (in the orientation represented in FIG. 1), the distance between the virtual surface 22 and the measurement object surface 13 is so small that the feeler ball 20 can readily make the step from the virtual surface 22 to the measurement object surface 13, when the feeler pin 18 is displaced from position B to position C in the direction of advance 28. Subsequently, for the groove 16 at position D, the same process is repeated as for the groove 16 at position B. The feeler ball 20 again passes from an actual section 24 of the surface 14 to a virtual section 26 of the surface 14, which is formed by the virtual surface 22. This prevents the feeler ball 20 from entering the groove 16 fully at position D, and this groove 16 can also be navigated without risk. The measurement process of the method 10 is then completed at a position E of the feeler pin 18.

By means of the described method 10, it is readily possible to cross the grooves 16 in the measurement object 12. Furthermore, it is not necessary to lift the feeler ball 20 from the actual measurement object surface 13, in order to make the feeler ball 20 so to speak "jump" over the grooves 16. All of the measurement object surface 13 to be measured is therefore sampled.

Figure 2:
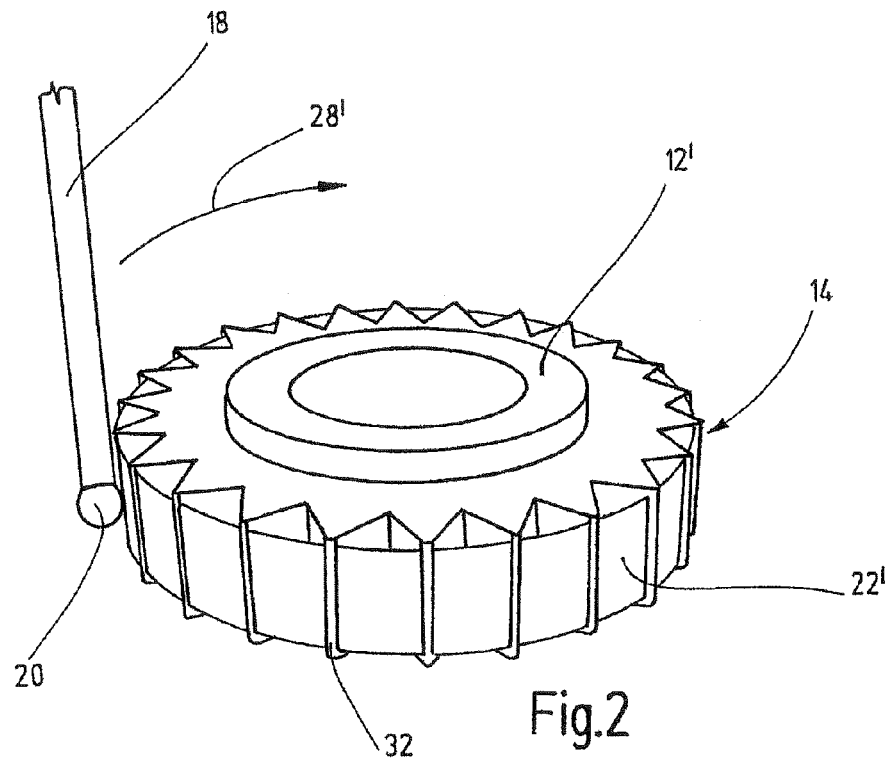
FIG. 2 shows a second embodiment of the method.

A further embodiment is represented by way of example in FIG. 2. In this case, a measurement object 12' in the form of a toothed wheel is to be measured, in the present case the head circle of the teeth. The surface 14 to be measured therefore has actual sections in the form of tooth tips 32 of the measurement object 12' and a cylindrical virtual surface 22', which is placed around the measurement object 12'. In this way, it is possible to measure just the head circle, or the tooth tips 32. The feeler pin 18 with the feeler ball 20 does not need to enter the gaps between the teeth, since these are covered by the virtual surface 22'. The direction of advance 28' is circular in this case.

Figures 3A, 3B:
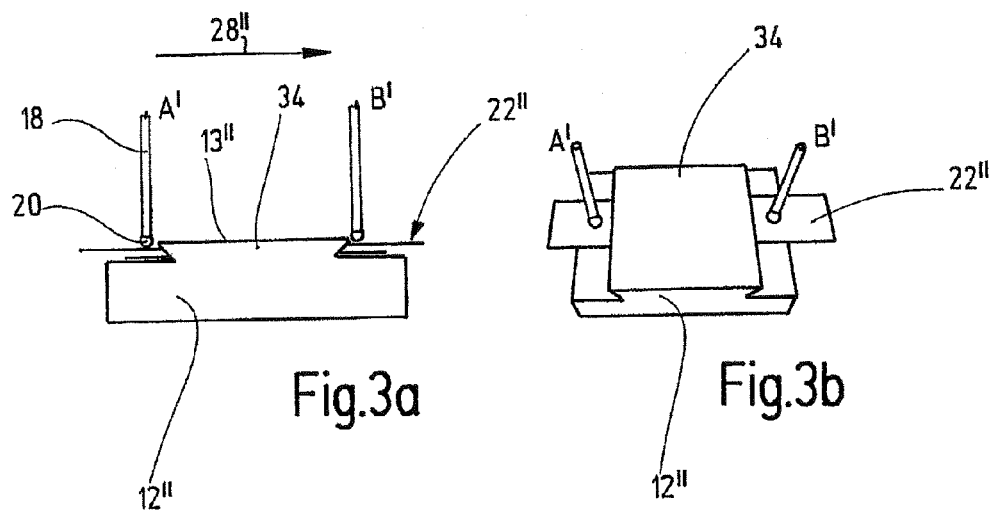
FIGS. 3a and 3b show a third embodiment of the method.

A third embodiment is represented in FIGS. 3a and 3b. In this case, a width of a dovetail 34 of the measurement object 12" is intended to be measured. In order to establish the width of the dovetail 34, a virtual surface 22" is provided so that the feeler ball 20 cannot engage under the dovetail 34 and catch in it. The virtual surface 22" is provided at only a small distance from the measurement object surface 13" of the dovetail 34, so that the feeler ball 20 can arise from the virtual surface 22" onto the actual surface 13'. During a measurement process, the feeler pin 18 is correspondingly moved from a position A' and along the direction of advance 28" into the position B' and the width of the dovetail 34 is thus detected.

FIGS. 4a to 4c show the measurement object 12''' in the form of a saw blade, comprising saw teeth 36 whose blades are intended to be measured. To this end, similarly as in the measurement of the head circle of a toothed wheel, a cylindrical virtual surface 22''' is provided. This prevents the feeler ball 20''' from entering a gap between the saw teeth 36 and catching behind the blades. Owing to the virtual surface 22''', it is therefore also possible to scan in a direction of advance 28''' against the blades of the saw teeth 36. A plurality of virtual surfaces 22''' may be arranged, as shown by FIGS. 4a and 4b. In this way, it is possible to detect both an upper blade edge 37 and a lower blade edge 38 with the aid of circular interpolation.

Figure 5:
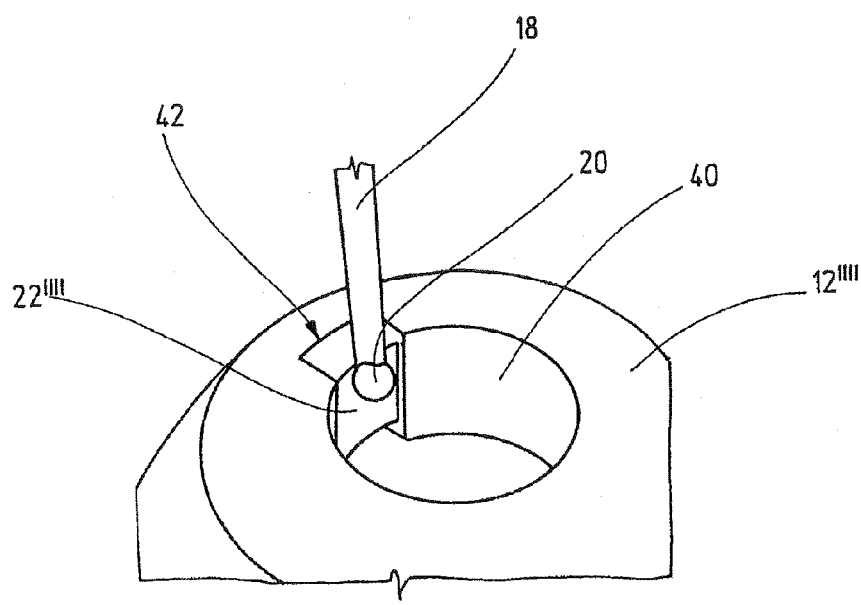
FIG. 5 shows a fifth embodiment of the method.

The situation is similar in the example of a further embodiment represented in FIG. 5. In this case, a bore 40, or its internal diameter, is measured in a measurement object 12'''. The bore 40 however, comprises a milled keyway groove 42. In order to prevent the feeler pin 18 from catching in this keyway groove 42, a virtual surface 22'''' is placed over the keyway groove 42 in order to prevent the feeler pin 18, or the feeler ball 20, from entering too deeply into the keyway groove 42. It is thus possible to scan the bore 40 in one run and determine its internal diameter by means of circular interpolation.

Figures 6A, 6B:
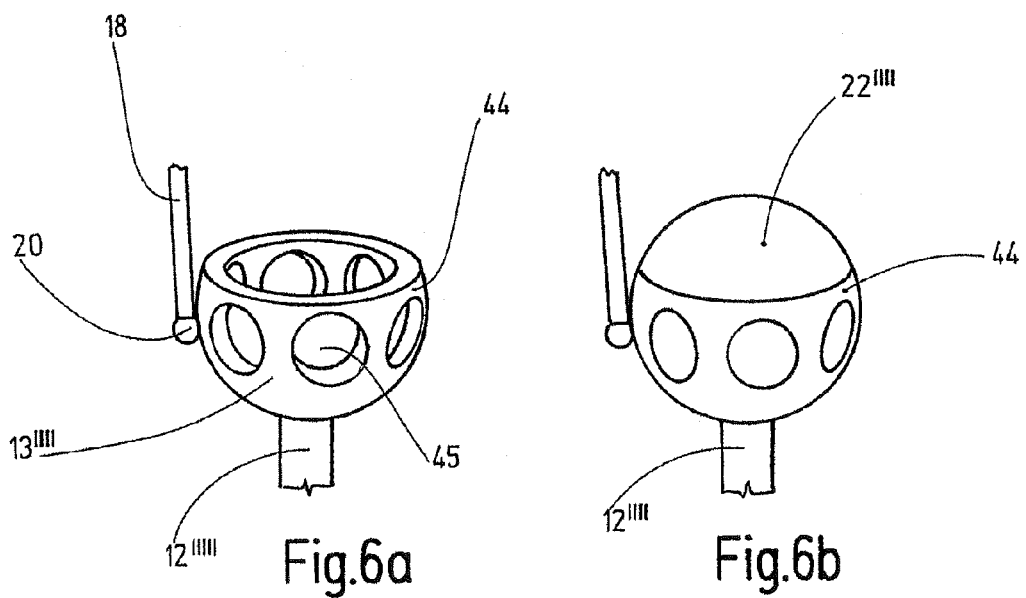
FIGS. 6a and 6b show a sixth embodiment of the method.

Another example is represented in FIGS. 6a and 6b. In this case, the spherical shape of an inner part 44 of an articulated shaft is intended to be measured. So that the feeler ball 20 does not catch in openings 45 of the inner part 44, a virtual surface 22'''' which has a spherical shape is placed in the inner part. In this way, it is possible, for example, for a measurement object surface 13'''' of the inner part 44 in the form of an outer sphere to be measured and determined by means of spherical interpolation.

Figure 7:
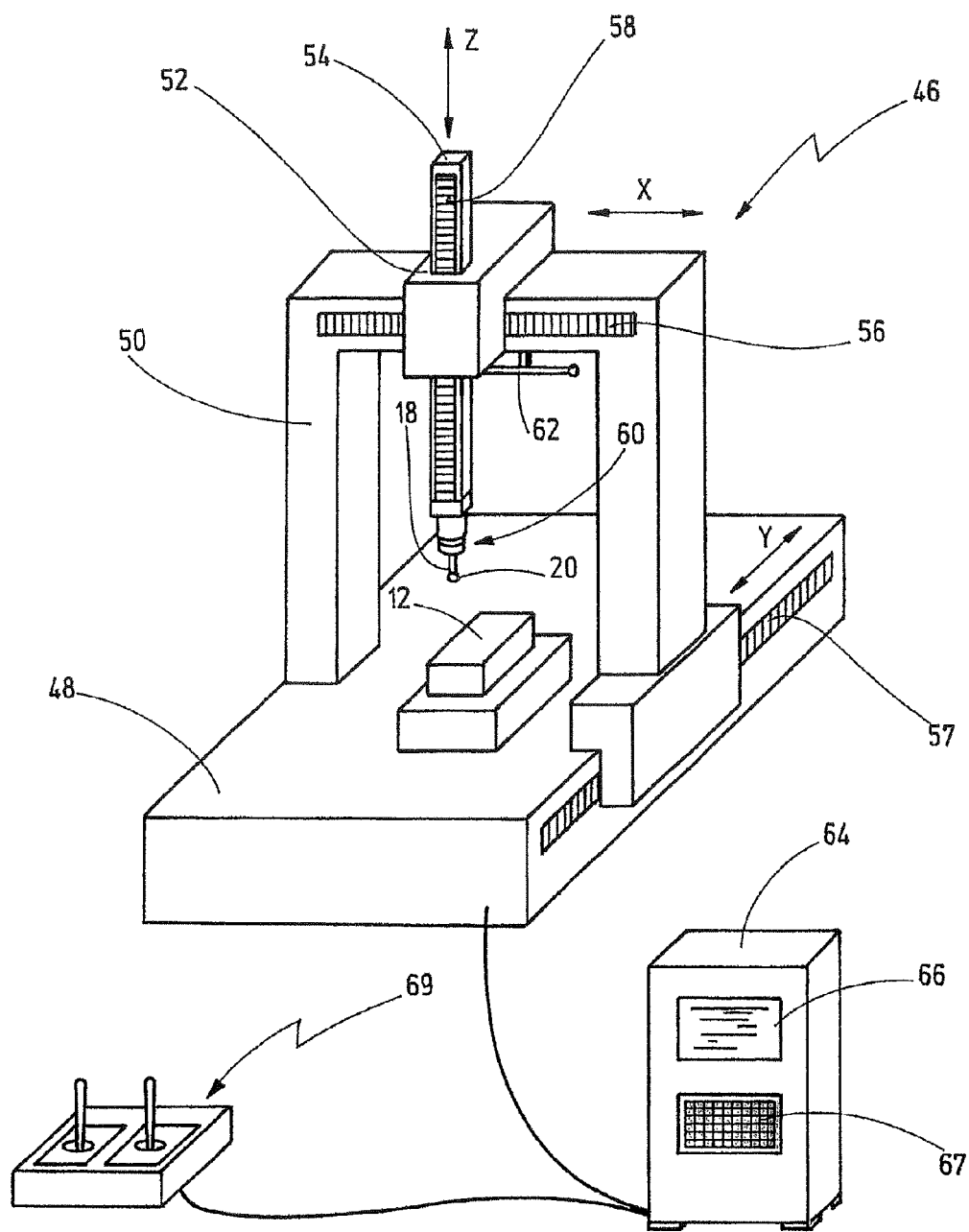
FIG. 7 shows a coordinate measuring machine according to the second aspect of the invention.

FIG. 7 shows a coordinate measuring machine 46 in one embodiment of the invention.

The coordinate measuring machine 46 comprises a measurement surface 48, on which the measurement object 12 is arranged. On the measurement surface 48, a gantry 50 is supported in such a way that it can move in a Y direction. On the gantry 50, a carriage 52 is supported in such a way that it can move in an X direction. In the carriage 52, a quill 54 is in turn supported in such a way that it can move in a Z direction.

On one end of the quill 54, there is a feeler head 60 in which the feeler pin 18 with the feeler ball 20 is received.

In this way, the feeler pin 18 can be driven in any direction on the measurement object 12 and the measurement object 12 can be sampled with the feeler ball 20.

Scales 56, 57, 58 are provided, along which the gantry 50, the carriage 52 and the quill 54 can be moved. By means of suitable sensors, the positions of the gantry 50, the carriage 52 and the quill 54 can thus be determined with the aid of the scales 56, 57, 58. The feeler head 60 comprises further sensors (not represented), which may be configured to measure actively or passively. By means of these sensors, and deflection of the feeler pin 18 relative to the feeler head 60, or the quill 54, can be determined so that a position of the feeler ball 20 is also known.

The coordinate measuring machine 46 furthermore comprises a controlling device 64 which, for example, may be formed as a conventional computer. In the conventional configuration, the controlling device 64 then comprises an output device 66 and an input device 67, so that a user can read results of measurements, or for example start a running program for a measurement process, on the output device 66. By means of the input device 67, for example, various modifications may be carried out with respect to the speed of the measurement process, the surfaces to be sampled, etc.

To this end, the controlling device 64 is capable of measuring the measurement object 12 according to the method described above. On the basis of the measurement object surface 13 to be measured, to this end, the controlling device 64 is capable of automatically arranging virtual surfaces 22 accordingly, for example by arranging virtual surfaces separated by a certain extent from and parallel to the actual measurement object surface 13 to be measured. For example, in the case of a spherical surface to be measured, a virtual spherical surface of somewhat smaller radius with the same center may be arranged in order to prevent the feeler pin from falling into a depression of the spherical surface to be measured. Falling into a depression can therefore take place even without knowledge about depressions or grooves which are actually present.

As an alternative or in addition, it is of course also possible to provide an interface device 69 in order to carry out a measurement process manually. For example, a particular measurement process may be trained or, if the controlling device 64 fails, the control of the coordinate measuring machine 46 may be undertaken manually.

The controlling device 64 may, as represented, comprises a cable connection to the other elements of the coordinate measuring machine 46, although it may also be connected wirelessly. It is of course also possible for the controlling device 64 to be an integral component of the other elements, for example being arranged in the measurement surface 48, or in the gantry 50. The output device 66 or the input device 67 may also be arranged there.

With the aid of a simplified schematic representation, FIG. 8 shows the basic functionality of the feeler head 60. The feeler head 60 is in this case configured as an active feeler head. The feeler head 60 has a stationary part 72 and a moving part 74, which are connected to one another by means of two leaf springs 42, 44. The leaf springs 76, 78 form a spring parallelogram, which permits movement of the part 74 in the direction of the arrow 80. The feeler pin 18 can therefore execute an deflection by a distance T from its resting position. The feeler head 60 in the deflection position is schematically represented at the reference 18'.

The deflection of the feeler pin 18 relative to the stationary part 72 may be due to sampling of the measurement object 12. The deflection of the feeler pin 18 is taken into account when determining the spatial coordinates of the feeler ball 20. Furthermore, in the case of an active feeler head 60, the deflection of the feeler pin 18 may be generated with the aid of a measuring force generator. A limb 82, 84 is respectively arranged on the stationary part 72 and on the moving part 74. The limbs 82, 84 are parallel to the leaf springs 76, 78 and mutually parallel. A sensor 86 (here represented with a scale 88) and a measuring force generator or measuring force transducer 90 is arranged between the limbs 82, 84. The sensor 86 may be a plunger coil, a Hall sensor, a piezoresistive sensor or another kind of sensor, with the aid of which the spatial deflection of the feeler pin 18 relative to the stationary part 72 can be determined. The measuring force generator 90 may, for example, be a plunger coil with the aid of which the two limbs 82, 84 can be drawn toward one another or pressed apart from one another. The feeler head 60 is correspondingly also connected to the controlling device 64, so that the latter can on the one hand read variables such as the deflection and the feeler force, and on the other hand control the measuring force generator 90.

In the simplified representation in FIG. 8, the feeler head 60 merely permits deflection of the feeler pin 18 in the direction of the arrow 46. It is, however, known to the person skilled in the relevant art that such a feeler head 60 typically permits corresponding deflection in two other orthogonal spatial directions. An exemplary embodiment of such a feeler head 60 is described, for example in the document DE 44 24 225 A1, the disclosure of which is included here by reference. The invention is not, however, restricted to this particular feeler head 60, and may be implemented with other measuring or switching feeler heads and sensor heads of other measuring systems, in particular passive feeler heads.

It is known to the person skilled in the relevant art that a feeler head 60 or sensor head of the type represented in a very simplified way in FIG. 8 generally comprises a mount on which the feeler head 18 or another sensor is replaceably fastened.

What is claimed is:

1. A method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device, wherein the surface comprises at least one actual section, which corresponds to a measurement object surface, and at least one virtual section, wherein the feeler head is an actively measuring feeler head and the controlling device controls a measuring force (F) of the feeler pin, a counterforce being applied to a measuring force transducer of the actively measuring feeler head proportionally to a penetration depth of the feeler pin into the at least one virtual section.

2. A method for controlling a measurement process of a coordinate measuring machine for measuring a measurement object, wherein the coordinate measuring machine comprises a controlling device and a feeler head having a feeler pin, and wherein a relative movement between the feeler pin and a surface of the measurement object is controlled by the controlling device, wherein the surface comprises at least one actual section, which corresponds to a measurement object surface, and at least one virtual section, wherein the feeler head is a passively measuring feeler head and the controlling device controls a deflection of the feeler pin, a virtual deflection being applied to a setpoint deflection of the feeler pin proportionally to a penetration depth (D) of the feeler pin into the at least one virtual section.

3. The method as claimed in claim 2, wherein the virtual deflection is directed oppositely to the setpoint deflection so that, for a particular penetration depth (D) of the feeler pin in the at least one virtual section, an equilibrium is set up between the setpoint deflection and the virtual deflection.

4. A coordinate measuring machine for measuring a measurement object, having a controlling device and a feeler head, which comprises a feeler pin, wherein a relative movement between the feeler pin and a surface of the measurement object is controlled by the controlling device, wherein the surface comprises at least one actual section which corresponds to a measurement object surface, and at least one virtual section, wherein the feeler head is an actively measuring feeler head and the controlling device controls a measuring force (F) of the feeler pin, a counterforce being applied to a measuring force transducer of the actively measuring feeler head proportionally to a penetration depth (X) of the feeler pin into the at least one virtual section.

5. A coordinate measuring machine for measuring a measurement object, having a controlling device and a feeler head, which comprises a feeler pin, wherein a relative movement between the feeler pin and a surface of the measurement object is controlled by the controlling device, wherein the surface comprises at least one actual section which corresponds to a measurement object surface, and at least one virtual section, wherein the feeler head is a passively measuring feeler head and the controlling device controls a deflection of the feeler pin, a virtual deflection being applied to a setpoint deflection of the feeler pin proportionally to a penetration depth of the feeler pin into the at least one virtual section.

6. The coordinate measuring machine as claimed in claim 5, wherein the virtual deflection is directed oppositely to the setpoint deflection so that, for a particular penetration depth (D) of the feeler pin into the at least one virtual section, an equilibrium is set up between the setpoint deflection and the virtual deflection.

* * * * *

UNITED STATES PATENT AND TRADEMARK OFFICE
CERTIFICATE OF CORRECTION

PATENT NO.         : 8,745,886 B2
APPLICATION NO.    : 13/572967
DATED              : June 10, 2014
INVENTOR(S)        : Otto Ruck et al.

It is certified that error appears in the above-identified patent and that said Letters Patent is hereby corrected as shown below:

In the Claims:

Column 13,

Line 8 (Claim 4), "(X)" should be -- (D) --.

Signed and Sealed this
Twenty-third Day of September, 2014

Michelle K. Lee
*Deputy Director of the United States Patent and Trademark Office*